Figure 2:
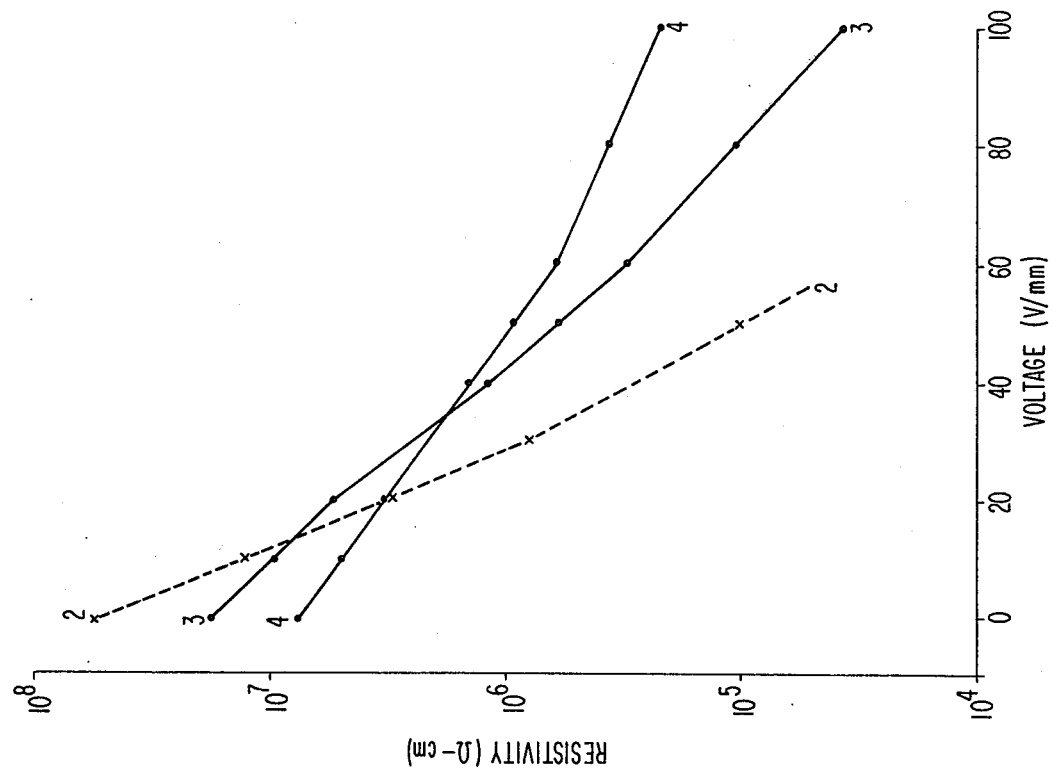

United States Patent [19]
Fujikawa

[11] 4,014,822
[45] Mar. 29, 1977

[54] SEMICONDUCTOR CERAMIC COMPOSITION
[75] Inventor: Nagao Fujikawa, Takatsuki, Japan
[73] Assignee: Murata Manufacturing Co., Ltd., Japan
[22] Filed: Apr. 26, 1974
[21] Appl. No.: 464,576

Related U.S. Application Data
[63] Continuation-in-part of Ser. No. 225,219, Feb. 10, 1972, abandoned, which is a continuation-in-part of Ser. No. 849,775, Aug. 13, 1969, abandoned.

[30] Foreign Application Priority Data
Aug. 13, 1968 Japan .............................. 43-57578

[52] U.S. Cl. .............. 252/520; 252/518; 252/521
[51] Int. Cl.$^2$ .......................................... H01B 1/06
[58] Field of Search ............. 252/520, 521, 63.2, 252/518

[56] References Cited
UNITED STATES PATENTS
3,373,120  3/1968  Nitta et al. .......................... 252/520

FOREIGN PATENTS OR APPLICATIONS
12,146  1966  Japan

Primary Examiner—Leland A. Sebastian
Assistant Examiner—Josephine Lloyd
Attorney, Agent, or Firm—Craig & Antonelli

[57] ABSTRACT

A semiconductor ceramic composition consists essentially of 83.95 to 98.65 mol% of barium titanate, 0.13 to 0.45 mol% of manganese oxide, 0.20 to 15 mol% of silicon dioxide and 0.23 to 1.65 mol% of one or more oxides selected from the group consisting of oxides of rare earth elements, bismuth and antimony, the content of one or more oxides of said group being 0.10 to 1.20 mol% greater than that of manganese oxide. The semiconductor ceramic composition has a markedly high positive resistance temperature characteristic.

21 Claims, 4 Drawing Figures

SEMICONDUCTOR CERAMIC COMPOSITION

This application is a continuation-in-part of application Ser. No. 225,219 filed on Feb. 10, 1972 now abandoned which is, in turn, a continuation-in-part of application Ser. No. 849,775 filed on Aug. 13, 1969 now abandoned. The present invention relates to a ceramic composition comprising barium titanate, more particularly, to a semiconductor ceramic compositon comprising barium titanate and having a markedly high positive resistance temperature characteristic.

Hitherto, it has been known that a semiconductor ceramic having positive resistance-temperature characteristics can be obtained by incorporating one or more of rare earth elements (e.g. Ce, Y, La), Sb and Bi into a ceramic compositon of perovskite structure comprising barium titanate with or without one or more additives (e.g. titanates other than barium titanate, zirconates, stannates) and sintering the resultant mtemperature characteristic.

Hitherto, it has been known that a semiconductor ceramic having positive resistance-temperature characteristics can be obtained by incorporating one or more of rare earth elements (e.g. Ce, Y, La), Sb and Bi into a ceramic composition of perovskite structure comprising barium titanate with or without one or more additives (e.g. titanates other than barium titanate, zirconates, stannates) and sintering the resultant mixture. The thus obtained ceramics may be used for temperature control, current control and the like by utilizing its resistance-temperature characteristics. For such use, the ceramic is desired to have a high change ratio of specific resistance on temperature, i.e. to have a characteristics that the specific resistance is abruptly increased in a certain temperature range.

As the ceramics meeting the said desire, there has been provided the one containing a certain amount of Mn as additive [Japanese patent publication No. 12146/1966]. This ceramic shows a remarkably high, positive resistance-temperature characteristic at a low input voltage. The characteristics is however, much lowered at a high input voltage since the dependency of the specific resistance on voltage is large. Further, it is apt to be reduced in an atmosphere of low partial pressure of oxygen at a high temperature to lose the characteristic and has such disadvantages as limitation on the materials for electrode and impossibility of heat treatment in vacuo and of vacuum sealing.

It has also been known that, generally, incorporating Mn into barium titanate ceramics tends to prevent the formation of semiconductor ceramics. In particularly, if the amount of Mn added is more than 0.03 wt% (i.e. 0.128 mol%), the specific resistance of the barium titanate ceramics at ordinary temperature become more than $10^6 \Omega$-cm, resulting in a marked decrease of positive temperature coefficient.

However, it has now been found that by incorporating Mn, Si and one or more elements selected from the group consisting of rare earth elements, Bi and Sb into the basic composition of barium titanate with a certain interrelation between the amount of Mn and that of one or more elements of the said group, it is possible to produce the semiconductor ceramics having a markedly high positive resistance-temperature characteristic and being low in the dependence of the specific resistance on voltage even at a high temperature and excellent in the voltage resistant life characteristic under the working condition. It has been found that the additional incorporation of a certain amount of $Al_2O_3$ results in the depression in the water-absorption rate of the resultant ceramics. The present invention is based on these findings.

Accordingly, a basic object of the present invention is to provide a novel ceramic composition for semiconductor materials.

Another object of this invention is to provide a semiconductor ceramic composition having the markedly high positive resistance temperature characteristic.

A further object of the invention is to provide a semiconductor ceramic composition having the positive resistance temperature characteristic and being decreased in the water content.

These and other objects of the invention will be further apparent to those skilled in the art from the following descriptions.

According to the present invention, there is provided a semiconductor ceramic composition consisting essentially of 83.95 to 98.65 mol% of the basic composition composed of 47.0 to 50.0 mol% of barium oxide and 50.0 to 53.0 mol% of titanium dioxide, 0.13 to 0.45 mol% of manganese oxide, 0.20 to 15 mol% of silicon dioxide and 0.23 to 1.65 mol% of one or more oxides selected from the group consisting of oxides of rare earth elements, bismuth and antimony, the content of one or more oxides selected from the said group being 0.10 to 1.20 mol% greater than that of manganese oxide.

As the basic composition other than barium titanate, there may also be used, for example, those prepared by replacing some parts of barium oxide of the barium titanate with the equivalent amounts of strontium oxide, calcium oxide and/or lead monoxide, and those prepared by replacing some parts of titanium dioxide of the barium titanate with the equivalent amounts of zirconium oxide and/or stannic oxide. It is preferred to substitute strontium oxide, calcium oxide and/or lead monoxide for barium oxide in 0.05 to 40 mol% of the latter. In this case, the basic composition consists of 30 to 49.975 mol% of barium oxide, 0.025 to 20 mol% of strontium oxide, calcium oxide and/or lead monoxide and 50.0 to 53.0 mol% of titanium dioxide. It is preferred to substitute zirconium oxide and/or stannic oxide for titanium dioxide in 0.05 to 40 mol% of the latter. In such case, the basic composition consists of 47.0 to 50 mol% of barium oxide, 0.025 to 20 mol% of zirconium oxide and /or stannic oxide and 30 to 49.975 mol% of titanium dioxide.

The above ingredients are incorporated in the form of their salts (e.g. carbonates, sulfates), oxides or hydroxides into the objective composition.

The numerical limitations on the additives are essential, as hereinafter described in detail, for attaining the object of the invention.

The said composition of the invention is obtained in a manner conventionally adapted for producing semiconductor ceramics.

The semiconductor ceramic composition of the invention is provided with the markedly high positive resistance temperature characteristic and has the favorable switching characteristic in that the resistivity is increased abruptly in a certain range. The semiconductor ceramic composition is small in the dependency of the resistivity on voltage even at a high temperature. In addition, the voltage resistant life characteristic is excellent and the resistance temperature characteristic is scarcely influenced on atmospheric treatment.

Therefore, the semiconductor ceramic composition of the invention is utilizable as a heat element to be applied a high voltage, a current controller, a thermostat and the like. The present invention will be hereinafter illustrated in detail be way of example.

Using $BaCO_3$, $SrCO_3$, $CaCO_3$, $TiO_2$, $Ce_2(CO_3)_3$, $Y_2O_3$, $MnCO_3$, $SiO_2$ and $Al_2O_3$ as the starting materials, there were prepared the compositions as shown in Table 1 wherein $Ce_2(CO_3)_3$ and $Y_2O_3$ are converted in terms of $Ce (CO_3)_{3/2}$ and $YO_{3/2}$ respectively for convenience on comparison, the sample numbers 1, 2, 5, 11 and 17 being not within the scope of the present invention. Each compositions was charged with agate balls in a polyethylene-lined pot mill and pulverized in wet for about 20 hours. After elimination of water, the resulting mixture was calcinated at 1170° C for 1 hour. The calcinated material was charged with about 3 percent by weight of vinyl acetate resin as a binder and agate balls in a pot mill and mixed for about 20 hours. After drying, the resulting mixture was passed through a sieve of 50 to 200 mesh and molded under a pressure of about 800 kg/cm² by the use of an oil press to form a disk of about 14 mm in diameter and about 3 mm in thickness. The molded article was sintered in a tunnel furnace under an autogenic atmosphere at 1370° C for about 1 hour.

Quantitative analysis of thus obtained samples were made with the X-ray fluorometry and the atomic absorption spectrophotometry. From the results, it was confirmed that metal elements in each sample are present in the very same molar ratio as that observed in the corresponding starting composition. Thus, the molar percentages of the components in the sample may be represented by that of the corresponding starting materials in the starting composition.

On each surface of the sample, there was provided an indium-gallium alloy as an electrode showing the ohmic contact. The temperature characteristics of the resistivity was measured by applying a DC input voltage of 0.5–1.5 V per 1 mm of thickness. The results are shown in Table 2. Some typical ones are graphically shown in FIG. 1.

Figure 1:
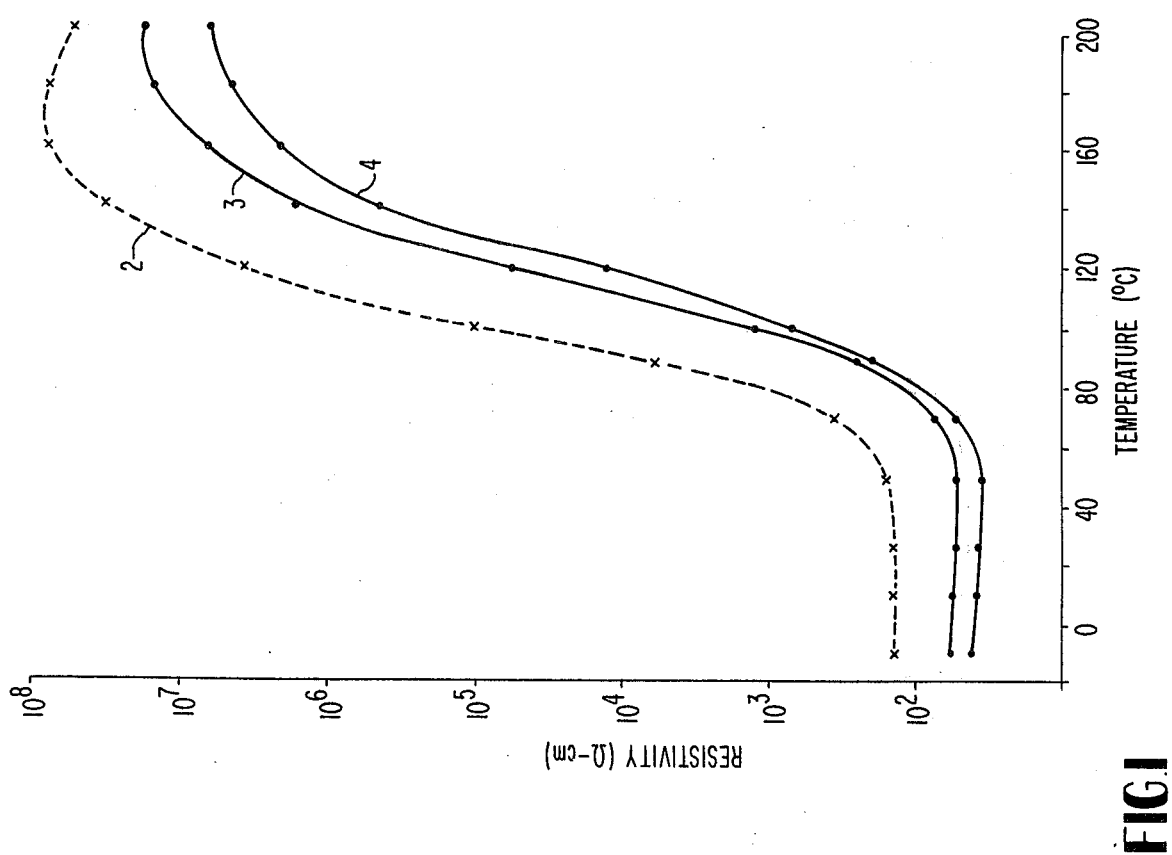

From Table 2 and FIG. 1, it will be understood that a high positive resistance temperature characteristic is gained only in the ceramics wherein manganese and one or more of rare earth elements, bismuth and/or antimony are in a certain quantitative relationship. When the amount of rare earth elements, bismuth and/or antimony is too small to that of manganese, the specific resistance at room temperature is more than $10^6$ Ω-cm and the positive resistance temperature characteristic is slight. In case of the composition of the invention, the specific resistance at an ordinary temperature is low and the positive resistance temperature characteristic is markedly large. Particularly in FIG. 1, it is seen that the composition of the invention (cf. solid lines 3 and 4) is low in the resistivity at an ordinary temperature, markedly high in the positive resistance temperature characteristic and abrupt in the increase of the resistivity, compared with the one outside of the invention (cf. dotted line 2). Thus, the ceramics of the invention has an excellent switching characteristic.

Keeping the same sample as above at such a temperature that the resistivity reaches the highest, i.e. about 200° C, a DC voltage of 1 to 100 V per 1 mm of thickness was applied thereto. The dependency of the resistivity on voltage under such conditions was determined and is shown in FIG. 2. From this FIGURE, it is understood that the ceramics of the invention (cf. solid lines 3 and 4) is little in the decrease of the specific resistance even at a high voltage and small in the voltage dependency at a high temperature, compared with the one outside of the invention (cf. dotted line 2).

As understood from FIG. 2, the logarithmic value of the resistivity is decreased almost proportionally to the input voltage per unit thickness. Thus, the resistance voltage coefficient as an indication for the dependency of the resistivity on voltage was calculated on each sample according to the following equation:

$$\text{Resistance voltage coefficient (\% V)} = \frac{2.303 \log \left( \frac{\text{Resistance at 50 V input voltage}} {\text{Resistance at 10 V input voltage}} \right)}{50 V - 10 V} \times 100$$

The results are shown in Table 2, from which it can be seen that the dependence of the resistivity on voltage at a high temperature is much improved by addition of Si. The reason why the addition of Si is limited to 0.20 to 15 mol% is that the amount less than 0.2 mol% is not so effective in improvement of the voltage dependence and the quantity more than 15 mol% does not afford ceramics of good quality.

Figure 3:
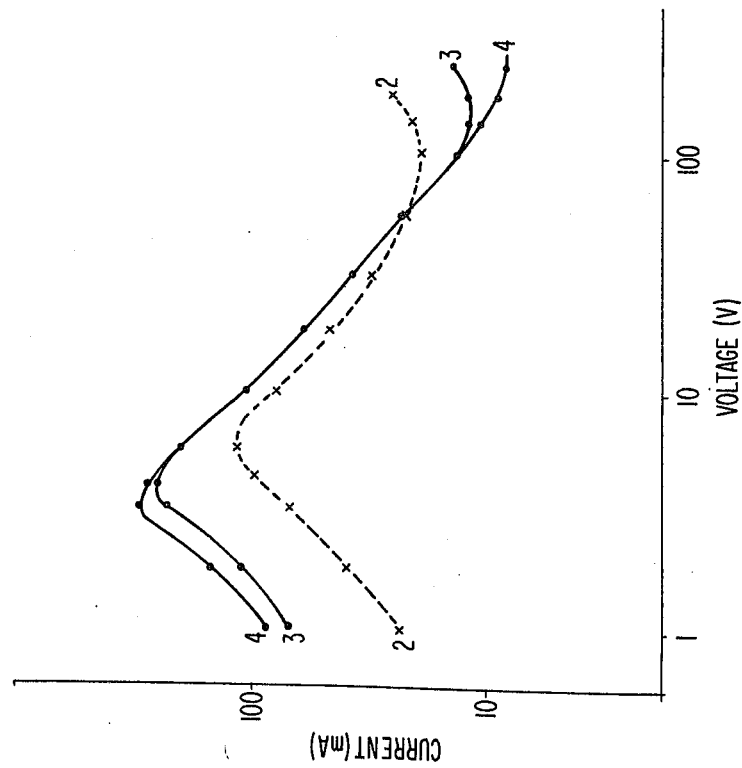

On each surface of the same sample as above but being of about 11.5 mm in diameter and about 2.5 mm in thickness, an electrode of ohmic contact was provided. The sample was kept in a stationary air at about 25° C and applied an alternating voltage of 60 Hz. The measured voltage-current characteristic at a thermal eqilibrium is shown in FIG. 3, wherein the sample numbers 2, 3 and 4 include respectively Si in 0, 1 and 2 mol%. From this FIGURE, it is noted that the ceramics of the invention (cf. solid lines 3 and 4) exhibits a good voltage-current characteristic. Particularly, in case of the sample number 4 which includes a relatively large amount of Si, no current increase is seen even at an input voltage higher than 320° C, in spite of the lowest primary resistance as 9.4Ω.

Figure 4:
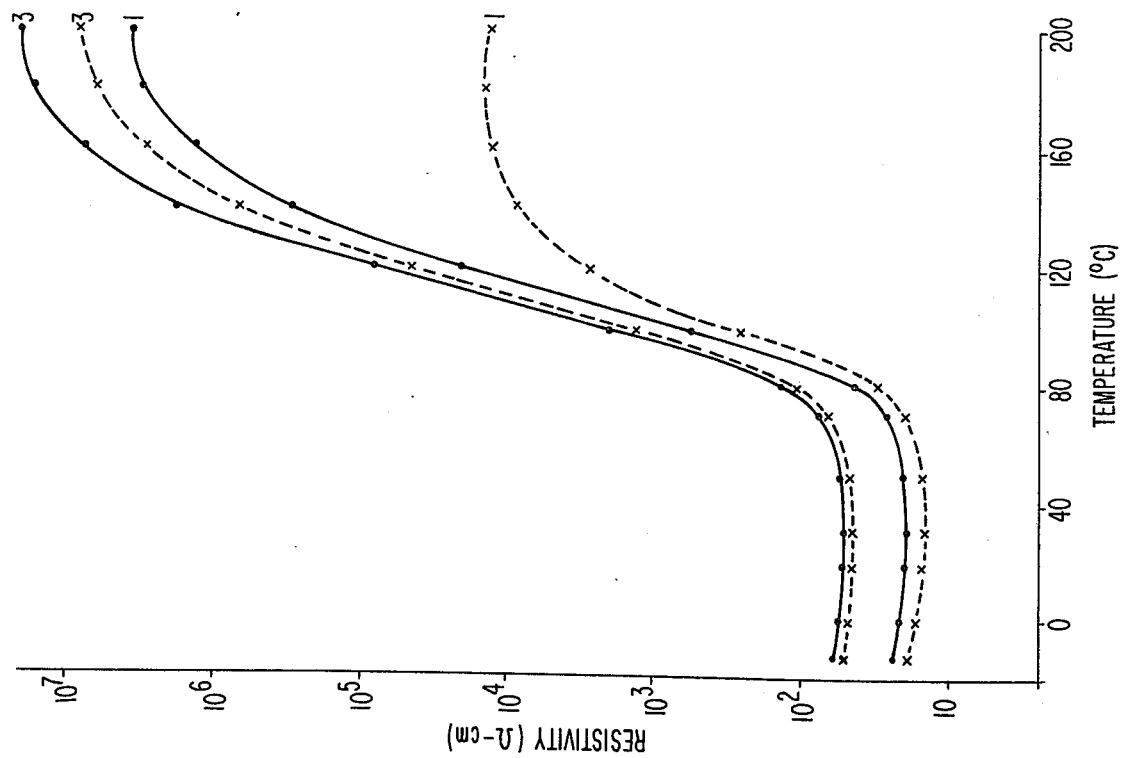

The sample numbers 1 and 3 were heated in nitrogen gas at 600° C for 30 minutes, and the resistance temperature characteristic before and after the heat-treatment was tested. The results are shown in FIG. 4 wherein the broad lines represent the values before treatment and the thin lines do those after treatmen'. From this FIGURE, it is seen that the ceramics of the invention is scarcely influenced by treatment in an atmosphere other than air at a high temperature and the resistance temperature characteristic is not so much changed. Thus, the material for electrode may be freely selected from various and numerous materials.

Table 1

| Sample No. | Basic composition (mol) | | | | Composition (mol%) | | | | | |
|---|---|---|---|---|---|---|---|---|---|---|
| | $BaCO_3$ | $SrCO_3$ | $CaCO_3$ | $TiO_2$ | Basic composition | $Ce(CO_3)_{3/2}$ | $YO_{3/2}$ | $MnCO_3$ | $SiO_2$ | $Al_2O_3$ |
| 1 | 89.7 | 10 | — | 100 | 99.6 | 0.3 | — | 0.1 | — | — |
| 2 | 89.5 | 10 | — | 102 | 99.3 | 0.5 | — | 0.2 | — | — |
| 3 | 89.5 | 10 | — | 102 | 98.3 | 0.5 | — | 0.2 | 1 | — |
| 4 | 89.5 | 10 | — | 102 | 97.3 | 0.5 | — | 0.2 | 2 | — |
| 5 | 89.15 | 10 | — | 100 | 99.15 | 0.6 | — | 0.25 | — | — |
| 6 | 89.15 | 10 | — | 100 | 98.65 | 0.6 | — | 0.25 | 0.5 | — |
| 7 | 89.15 | 10 | — | 100 | 98.15 | 0.6 | — | 0.25 | 1 | — |
| 8 | 89.15 | 10 | — | φ | 97.15 | 0.6 | — | 0.25 | 2 | — |
| 9 | 89.15 | 10 | — | 100 | 94.15 | 0.6 | — | 0.25 | 5 | — |
| 10 | 89.15 | 10 | — | 100 | 89.15 | 0.6 | — | 0.25 | 10 | — |
| 11 | 89.1 | 10 | — | 100 | 99.075 | 0.65 | — | 0.275 | — | — |
| 12 | 89.1 | 10 | — | 100 | 98.575 | 0.65 | — | 0.275 | 0.5 | — |
| 13 | 89.1 | 10 | — | 100 | 98.075 | 0.65 | — | 0.275 | 1 | — |
| 14 | 89.1 | 10 | — | 100 | 97.075 | 0.65 | — | 0.275 | 2 | — |
| 15 | 89.1 | 10 | — | 100 | 94.075 | 0.65 | — | 0.275 | 5 | — |
| 16 | 89.1 | 10 | — | 100 | 89.075 | 0.65 | — | 0.275 | 10 | — |
| 17 | 89 | 10 | — | 100 | 99 | 0.7 | — | 0.3 | — | — |
| 18 | 89 | 10 | — | 100 | 98 | 0.7 | — | 0.3 | 1 | — |
| 19 | 89 | 10 | — | 100 | 97 | 0.7 | — | 0.3 | 2 | — |
| 20 | 89 | 10 | — | 100 | 94 | 0.7 | — | 0.3 | 5 | — |
| 21 | 91.1 | 8 | — | 101 | 97.1 | — | 0.7 | 0.2 | 2 | — |
| 22 | 91.05 | 8 | — | 101 | 97.05 | — | 0.75 | 0.2 | 2 | — |
| 23 | 91 | 8 | — | 101 | 97.0 | — | 0.8 | 0.2 | 2 | — |
| 24 | 90.95 | 8 | — | 101 | 96.95 | — | 0.85 | 0.2 | 2 | — |
| 25 | 90.95 | 8 | — | 101 | 96.85 | — | 0.85 | 0.2 | 2 | 0.1 |
| 26 | 88.7 | 8 | 2 | 101 | 96.95 | — | 0.85 | 0.2 | 2 | — |
| 27 | 88.7 | 8 | 2 | 101 | 96.85 | — | 0.85 | 0.2 | 2 | 0.1 |
| 28 | 88.7 | 8 | 2 | 101 | 96.70 | — | 0.85 | 0.2 | 2 | 0.25 |
| 29 | 90.85 | 8 | — | 101 | 96.90 | — | 0.9 | 0.2 | 2 | — |
| 30 | 90.75 | 8 | — | 101 | 96.75 | — | 1.0 | 0.25 | 2 | — |
| 31 | 90.65 | 8 | — | 101 | 96.65 | — | 1.1 | 0.25 | 2 | — |
| 32 | 90.55 | 8 | — | 101 | 96.55 | — | 1.2 | 0.25 | 2 | — |
| 33 | 90.6 | 8 | — | 101 | 96.6 | — | 1.1 | 0.3 | 2 | — |
| 34 | 90.6 | 8 | — | 101 | 96.5 | — | 1.2 | 0.3 | 2 | — |
| 35 | 90.6 | 8 | — | 101 | 96.4 | — | 1.3 | 0.3 | 2 | — |
| 36 | 90.4 | 8 | — | 101 | 96.4 | — | 1.2 | 0.4 | 2 | — |
| 37 | 90.3 | 8 | — | 101 | 96.3 | — | 1.3 | 0.4 | 2 | — |
| 38 | 90.1 | 8 | — | 101 | 96.1 | — | 1.5 | 0.4 | 2 | — |
| 39 | 90.95 | 8 | — | 101 | 93.95 | — | 0.85 | 0.2 | 5 | — |
| 40 | 90.95 | 8 | — | 101 | 91.95 | — | 0.85 | 0.2 | 7 | — |
| 41 | 90.95 | 8 | — | 101 | 88.95 | — | 0.85 | 0.2 | 10 | — |
| 42 | 90.95 | 8 | — | 101 | 86.95 | — | 0.85 | 0.2 | 12 | — |
| 43 | 90.95 | 8 | — | 101 | 83.95 | — | 0.85 | 0.2 | 15 | — |

Table 2

| Sample No. | Specific Resistance (Ω.cm) | | 25° C–20° C Resistance temperature change rate | Resistance voltage coefficient (%/v) |
|---|---|---|---|---|
| | 25° C | 200° C | | |
| 1 | 2.1 × 10 | 2.9 × 10⁶ | 1.4 × 10⁵ | −17.5 |
| 2 | 1.6 × 10² | 5.0 × 10⁷ | 3.1 × 10⁵ | −15.3 |
| 3 | 5.4 × 10 | 1.6 × 10⁷ | 2.96 × 10⁵ | −7.0 |
| 4 | 3.6 × 10 | 6.5 × 10⁶ | 1.8 × 10⁵ | −3.5 |
| 5 | 2.5 × 10² | 2.5 × 10⁷ | 1.0 × 10⁵ | −6.4 |
| 6 | 1.24 × 10² | 4.6 × 10⁶ | 3.7 × 10⁴ | −1.75 |
| 7 | 1.4 × 10² | 1.13 × 10⁷ | 8.1 × 10⁴ | −2.30 |
| 8 | 7.6 × 10 | 5.25 × 10⁶ | 6.9 × 10⁴ | −2.25 |
| 9 | 6.8 × 10 | 1.3 × 10⁶ | 1.9 × 10⁴ | −2.23 |
| 10 | 1.16 × 10² | 1.0 × 10⁶ | 8.7 × 10³ | −2.02 |
| 11 | 6.4 × 10² | 1.16 × 10⁸ | 1.82 × 10⁵ | −5.75 |
| 12 | 2.5 × 10² | 1.4 × 10⁷ | 5.7 × 10⁴ | −2.02 |
| 13 | 3.8 × 10² | 4.2 × 10⁷ | 1.1 × 10⁵ | −2.04 |
| 14 | 1.2 × 10² | 4.8 × 10⁶ | 4.0 × 10⁴ | −2.30 |
| 15 | 1.76 × 10² | 2.55 × 10⁷ | 1.45 × 10⁵ | −2.13 |
| 16 | 2.4 × 10² | 4.0 × 10⁷ | 1.65 × 10⁵ | −2.40 |
| 17 | 8.0 × 10² | 5.8 × 10⁷ | 7.2 × 10⁴ | −7.70 |
| 18 | 3.8 × 10² | 1.9 × 10⁷ | 5.0 × 10⁴ | −2.20 |
| 19 | 2.8 × 10² | 1.4 × 10⁷ | 5.0 × 10⁴ | −2.10 |
| 20 | 1.76 × 10² | 2.45 × 10⁶ | 1.4 × 10⁴ | −1.72 |
| 21 | 1.25 × 10² | 2.6 × 10⁷ | 2.14 × 10⁵ | −2.3 |
| 22 | 8.9 × 10 | 1.2 × 10⁸ | 1.36 × 10⁶ | −3.5 |
| 23 | 7.8 × 10 | 1.6 × 10⁸ | 2.1 × 10⁶ | −3.8 |
| 24 | 3.6 × 10 | 7.2 × 10⁷ | 2.0 × 10⁶ | −3.5 |
| 25 | 5.8 × 10 | 5.8 × 10⁶ | 1.0 × 10⁵ | −2.2 |
| 26 | 4.0 × 10² | 1.2 × 10⁹ | 3.0 × 10⁶ | −1.0 |
| 27 | 2.4 × 10² | 9.8 × 10⁷ | 4.1 × 10⁵ | −1.6 |
| 28 | 3.2 × 10² | 1.0 × 10⁸ | 3.1 × 10⁵ | −1.85 |
| 29 | 1.62 × 10² | 9.3 × 10⁸ | 5.7 × 10⁶ | −1.6 |
| 30 | 1.14 × 10² | 8.7 × 10⁸ | 7.6 × 10⁶ | −1.3 |
| 31 | 1.39 × 10² | 1.53 × 10⁹ | 1.1 × 10⁷ | −1.1 |
| 32 | 2.7 × 10³ | 3.8 × 10⁹ | 1.4 × 10⁷ | −1.0 |
| 33 | 5.76 × 10² | 6.9 × 10⁸ | 1.2 × 10⁶ | −1.0 |
| 34 | 6.0 × 10² | 1.2 × 10⁹ | 2.0 × 10⁶ | −1.0 |
| 35 | 2.72 × 10³ | 6.5 × 10⁸ | 2.4 × 10⁵ | −0.9 |
| 36 | 1.5 × 10³ | 4.8 × 10⁸ | 3.2 × 10⁵ | −1.1 |
| 37 | 3.75 × 10³ | 7.9 × 10⁸ | 2.1 × 10⁵ | −1.0 |
| 38 | 6.8 × 10³ | 1.1 × 10⁹ | 1.6 × 10⁵ | −0.9 |
| 39 | 7.6 × 10 | 1.45 × 10⁹ | 1.9 × 10⁷ | −2.1 |
| 40 | 6.8 × 10 | 5.6 × 10⁸ | 8.2 × 10⁶ | −2.0 |
| 41 | 6.6 × 10 | 1.56 × 10⁷ | 2.36 × 10⁵ | −1.9 |
| 42 | 1.08 × 10² | 2.38 × 10⁷ | 2.2 × 10⁵ | −1.9 |
| 43 | 1.37 × 10² | 3.3 × 10⁷ | 2.4 × 10⁵ | −1.7 |

What is claimed is:

1. A ceramic composition for making a semiconductor, said composition consisting essentially of 83.95 to 98.65 mol% of a basic composition composed of 47.0 to 50.0 mol% of barium oxide and 50.0 to 53.0 mol% of titanium dioxide, 0.13 to 0.45 mol% of manganese oxide, 0.2 to 15 mol% of silicon dioxide and 0.23 to 1.65 mol% of one or more oxides selected from the group consisting of oxides of rare earth elements, bismuth and antimony, the content of said one or more oxides being 0.10 to 120 mol% greater than the content of manganese oxide.

2. A composition according to claim 1, wherein 0.05 to 40 mol% of barium oxide in the basic composition is replaced by the equivalent amount of one or more oxides selected from the group consisting of strontium oxide, calcium oxide and lead monoxide.

3. A composition according to claim 2, wherein the basic composition consists of 30.0 to 49.975 mol% of barium oxide, 0.025 to 20 mol% of strontium oxide and 50.0 to 53.0 mol% of titanium dioxide.

4. A composition according to claim 2, wherein the basic composition consists of 30.0 to 49.975 mol% of barium oxide, 0.025 to 20 mol% of strontium oxide and calcium oxide and 50.0 to 53.0 mol% of titanium dioxide.

5. A composition according to claim 2, wherein the basic composition consists of 30.0 to 49.975 mol% of barium oxide, 0.025 to 20 mol% of calcium oxide and lead monoxide, and 50.0 to 53.0 mol% of titanium dioxide.

6. A composition according to claim 1, wherein 0.05 to 40 mol% of titanium dioxide in the basic composition is replaced by the equivalent amount of zirconium oxide and/or stannic oxide.

7. A composition according to claim 1, wherein $Al_2O_3$ is additionally incorporated in not more than 0.5 mol%.

8. A semiconductor comprising impurity-doped barium titanate, the chemical composition of said semiconductor, when measured in terms of the oxides making up said semiconductor, consisting essentially of 83.95 to 98.65 mol% of a basic composition composed of 47.0 to 50.0 mol% of barium oxide and 50.0 to 53.0 mol% of titanium dioxide, 0.13 to 0.45 mol% of manganese oxide, 0.2 to 15 mol% of silicon dioxide and 0.23 to 1.65 mol% of one or more oxides selected from the group consisting of oxides of rare earth elements, bismuth and antimony, the content of said one or more oxides being 0.10 to 1.20 mol% greater than the content of manganese oxide.

9. The semiconductor of claim 8, wherein 0.05 to 40 mol% of barium oxide in the basic composition is replaced by the equivalent amount of one or more oxides selected from the group consisting of strontium oxide, calcium oxide and lead monoxide.

10. The semiconductor of claim 9, wherein the basic composition consists of 30.0 to 49.975 mol% of barium oxide, 0.025 to 20 mol% of strontium oxide and 50.0 to 53.0 mol% of titanium dioxide.

11. The semiconductor of claim 9, wherein the basic composition consists of 30.0 to 49.975 mol% of barium oxide, 0.025 to 20 mol% of strontium oxide and calcium oxide and 50.0 to 53.0 mol% of titanium dioxide.

12. The semiconductor of claim 9, wherein the basic composition consists of 30.0 to 49.975 mol% of barium oxide, 0.025 to 20 mol% of calcium oxide and lead monoxide, and 50.0 to 53.0 mol% of titanium dioxide.

13. The semiconductor of claim 8, wherein 0.05 to 40 mol% of titanium dioxide in the basic composition is replaced by the equivalent amount of zirconium oxide and/or stannic oxide.

14. The semiconductor of claim 8, wherein $Al_2O_3$ is additionally incorporated in not more than 0.5 mol%.

15. A semiconductor ceramic consisting essentially of the fired reaction product obtained by firing an oxide composition consisting essentially of 83.95 to 98.65 mol% of a basic composition composed of 47.0 to 50.0 mol% of barium oxide and 50.0 to 53.0 mol% of titanium dioxide, 0.13 to 0.45 mol% of manganese oxide, 0.2 to 15 mol% of silicon dioxide and 0.23 to 1.65 mol% of one or more oxides selected from the group consisting of oxides of rare earth elements, bismuth and antimony, the content of said one or more oxides being 0.10 to 1.20 mol% greater than the content of manganese oxide.

16. The semiconductor of claim 15, wherein 0.05 to 40 mol% of barium oxide in the basic composition is replaced by the equivalent amount of one or more oxides selected from the group consisting of strontium oxide, calcium oxide and lead monoxide.

17. The semiconductor of claim 16, wherein the basic composition consists of 30.0 to 49.975 mol% of barium oxide, 0.025 to 20 mol% of strontium oxide and 50.0 to 53.0 mol% of titanium dioxide.

18. The semiconductor of claim 16, wherein the basic composition consists of 30.0 to 49.975 mol% of barium oxide, 0.025 to 20 mol% of strontium oxide and calcium oxide and 50.0 to 53.0 mol% of titanium dioxide.

19. The semiconductor of claim 16, wherein the basic composition consists of 30.0 to 49.975 mol% of barium oxide, 0.025 to 20 mol% of calcium oxide and lead monoxide, and 50.0 to 53.0 mol% of titanium dioxide.

20. The semiconductor of claim 15, wherein 0.05 to 40 mol% of titanium dioxide in the basic composition is replaced by the equivalent amount of zirconium oxide and/or stannic oxide.

21. The semiconductor of claim 15, wherein said oxide composition further contains $Al_2O_3$ in an amount of not more than 0.5 mol%.

* * * * *